United States Patent [19]

Ware

[11] Patent Number: 4,531,919
[45] Date of Patent: Jul. 30, 1985

[54] GARMENT FOR SIMULATING THE EFFECTS OF PREGNANCY ON THE HUMAN BODY

[76] Inventor: Linda M. Ware, 3760 Onyx St., Eugene, Oreg. 97405

[21] Appl. No.: 630,272

[22] Filed: Jul. 12, 1984

[51] Int. Cl.³ .......................... G09B 9/00; A41D 1/00
[52] U.S. Cl. .......................................... 434/262; 2/1; 2/69
[58] Field of Search ............... 434/262, 266, 267, 273, 434/268; 2/1, 69, DIG. 7

[56] References Cited

U.S. PATENT DOCUMENTS 4,411,629 10/1983 Voights .............................. 434/266
4,474,559 10/1984 Steiger .............................. 434/268

Primary Examiner—William H. Grieb
Attorney, Agent, or Firm—James D. Givnan, Jr.

[57] ABSTRACT

A garment for wear by those interested in experiencing the physical effects of full term pregnancy. A fluid filled, weighted body of several pounds overlies the wearer's stomach while a rib belt exerts a compressive force to alter lung capacity. A bladder pillow simulates the effect of a fetus on the bladder. Garment straps permit garment fitting to a wide range of physiques while weights may be added to weight the garment to the size and build of the wearer for a true simulation.

7 Claims, 6 Drawing Figures

U.S. Patent   Jul. 30, 1985   4,531,919
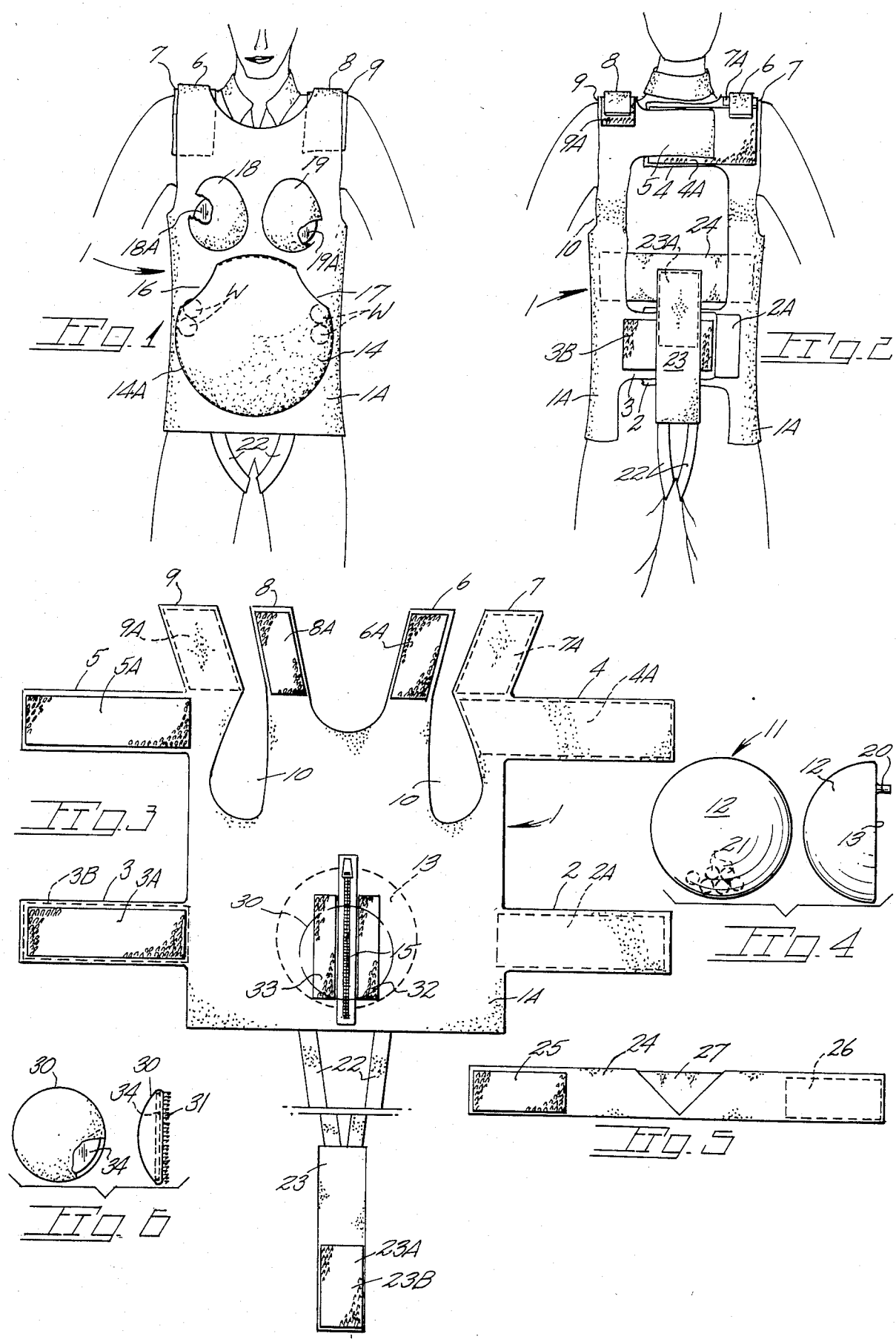

GARMENT FOR SIMULATING THE EFFECTS OF PREGNANCY ON THE HUMAN BODY

BACKGROUND OF THE INVENTION

The present invention pertains generally to garment construction and particularly to a garment which, when worn, simulates various physical aspects of pregnancy.

In the education of those anticipating parenthood it is a difficult task to convey to the prospective parent the physical changes and, to some extent, hardships encountered during a pregnancy, This is especially so in the case of the father for obvious reasons. Reading or hearing a list of physiological changes associated with pregnancy do not provide a lasting insight into such changes. Accordingly, a husband or a woman who has not experienced pregnancy have no opportunity to physically sense changes to the body during a pregnancy.

SUMMARY OF THE PRESENT INVENTION

The present invention is embodied in a garment having components which affect certain portions of the body so as to simulate the effects of pregnancy and hence educate those who would otherwise have no opportunity to experience same.

The present garment includes an abdomen or belly component of several pounds which is of variable weight to enable garment weight to be modified to best effect the simulation of pregnancy. A bladder pillow may be used with the garment to overlie the lower abdomen of the wearer to exert a degree of compression on the abdomen thereby simulating fetus weight on the expectant mother's bladder. Breast appendages on the garment include high density material and bear against the wearer's chest.

The fluid filled weighted member may include internal weights which move with respect to the wearer's abdomen to simulate fetal movement. Additionally, provision is made for the insertion of lead weights into garment pockets to vary garment weight to best suit the size and sex of the garment wearer for purposes of a true simulation.

A rib belt may be worn to exert a compressive force about the rib cage to inhibit lung capacity to further enhance the simulation.

The garment has cooperating straps which pass about the torso and shoulder straps all with closure material thereon to enable convenient donning and removal of the garment. A groin strap serves to adjustably bias the lower portion of the garment against the wearer's lower torso.

Important objects of the present garment include the provision of a weighted garment having components which bear against the wearer's anatomy to simulate like pressures exerted on a woman's body during the latter stages of pregnancy and thereby allow the wearer to sense, to a degree, certain physical aspects of pregnancy; the provision of a garment having an abdominal portion of considerable weight for placement over the wearer's abdomen for purposes of simulating pregnancy; the provision of a garment which has weighted components which may be varied to accomplish the simulation of pregnancy on persons, both male and female, of widely varying body builds; the provision of a garment capable of being readily applied to and removed from a wearer to permit convenient use in a group or class having many participants each of whom must wear the garment.

BRIEF DESCRIPTION OF THE DRAWING

In the drawing:

FIG. 1 is a front elevational view of the present garment in place on a standing persons;

FIG. 2 is a rear elevational view thereof;

FIG. 3 is an elevational view of the inner side of the garment;

FIG. 4 is a composite view of a garment bladder in frontal and side elevation;

FIG. 5 is an elevational view of a rib belt; and

FIG. 6 is a composite view of a garment bladder pillow in frontal and side elevation.

DETAILED DESCRIPTION OF THE PREFERRED EMBODIMENT

With continuing reference to the drawing wherein applied reference numerals indicate parts hereinafter similarly identified, the reference numeral 1 indicates generally the main body portion of the garment which is of a sturdy fabric for wear about the upright or ambulatory torso of a male or female overlying the frontal area of the torso.

For ease of donning, retention means are provided as cooperating strap elements at 2-3 and 4-5 arranged in upper and lower pairs to overlie, when joined, the wearer's upper back and the middle back. For joining of the strap elements expanses of fabric closure material at 2A-3A and 4A-5A is used which material has the desirable features of being readily adaptable to a wide range of torso shapes and sizes. Shoulder strap elements at 6-7 and 8-9 are engageable over the wearer's shoulder again in a variable and selective manner to best position the garment on a variety of torso shapes and sizes. Closure material at 6A-7A and 8A-9A (FIG. 3) permits shoulder strap element securement. Open areas 10 constitute arm holes.

A weighted body is indicated generally at 11 and is of generally hemispherical shape and of vinyl construction having a convex frontal area 12 and a rear wall 13 (FIG. 4). Means confining said weighted body in place is embodied in an enclosure formed by a fabric cover 14 and a lower area 1A of main body portion 1. The cover is stitched at 14A to lower area 1A. The enclosure is located adjacent the lower extremity of the main body portion to position the weighted body member 12 in the approximate position of a fetus with reference to the wearer's abdomen. An opening in the enclosure is normally closed by a zipper 15 and permits removal and emptying of the weighted member as later described for convenient carrying of the garment. Openings at 16 and 17 are of a size to receive a selected combination of five pound weights at W to adapt garment weight to the physique of the wearer, i.e., male-female, muscular or slight for an accurate simulation.

Appendages at 18 and 19 on the body portion 1 each contain a metal disc 18A-19A which may be of lead or other high density material along with padding for shaping.

The weighted body member 11, as best shown in FIG. 4, may be of bladder-like construction having an insertable valve stem 20 for the filling, sealing and emptying of water for convenience sake. To further simulate the carrying of a fetus, fetal movement is simulated by several spherical elements 21 movably confined within the bladder to randomly impinge against bladder rear wall 13 which is in abutment with the wearer's abdomen.

Groin straps at 22 pass between the wearer's upper legs and terminate in an elongate strip of fabric 23 having closure fabric 23A thereon engageable with an expanse of closure fabric 3B on the exterior of garment strap member 3.

A rib belt at 24 is for placement about the lower rib cage, per FIG. 2, with belt end segments being provided with hook and loop closure material strips 25 and 26. An elastic insert 27 permits the belt to conform to the shape of the rib cage for uniform pressure thereabout regardless of the torso's somewhat tapered shape. The belt serves to inhibit normal rib cage expansion during breathing to simulate reduced lung capacity experienced during the latter stages of pregnancy.

A bladder pillow at 30 in FIG. 6 includes closure material at 31 on one side for pillow attachment to cooperating straps 32-33 on the interior of the present garment rearwardly of weighted body 12 to thereby exert a slight compressive force on the wearer's abdomen and bladder. Closure material strips 32-33 on enclosure 14 receive and support the pillow. A metal disc 34 adds to pillow weight.

In use the garment is applied subsequent to placement of the rib belt about the lower rib cage. The long shoulder straps 6-7 and 8-9 permit precise locating of the weighted body in the appropriate location regardless of wide disparities between the physiques of different persons. Similarly, the back straps 4-5 and 2-3 adapt the garment to persons of widely varying size and shape. The weights at W may be used to increase garment weight from approximately thirty pounds to fifty pounds to encompass a range of physiques from women of slight or petite stature to men having a large frame. Approximate weights for the weighted body 12 when filled with water and loose weights is seventeen pounds; the bladder pillow five pounds; the breast appendages four pounds.

The main body 1 is full cut to provide adequate fabric to extend about the weighted body 12.

The following listed physical effects of pregnancy may be experienced with the present garment: body weight increase, backaches, diminished breathing, impaired mobility, organ and bladder pressure, body temperature increase, pulse and blood pressure increases, fetal movement against stomach and body profile changes to mention a few.

While the weighted body is disclosed as being fluid filled it will be understood that the same may be otherwise constructed, as for example, including a solid filler material of suitable weight which is somewhat less desirable than the preferred form earlier described.

While I have shown but one embodiment of the invention it will be apparent to those skilled in the art that the invention may be embodied still otherwise without departing from the spirit and scope of the invention.

Having thus described the invention, what is desired to be secured in Letters Patent is:

1. A garment for simulating the physiological effects of pregnancy when worn by an ambulatory wearer, said garment comprising,
    a main body portion for substantially overlying frontal placement on the torso of the wearer, retention means for holding the main body portion in place on a torso including strap elements for passage over the wearer's shoulders and the back of the wearer's torso,
    a weighted body representing a fetus located adjacent the lower extremity of the garment main body portion, and
    said main body portion including an enclosure confining said weighted body in place, said enclosure having an opening to permit the insertion of one or more weights to contribute to a true simulation.

2. The garment claimed in claim 1 additionally including weight carrying appendages on the main body portion and simulating enlarged breasts of an expectant mother.

3. The garment claimed in claim 1 wherein said strap elements include elongate expanses of closure material of the hook and loop type to facilitate accurate positioning of the weighted body on wearer.

4. The garment claimed in claim 1 wherein said weighted body is a fluid receptacle having a valve component enabling filling and draining of the receptacle.

5. The garment claimed in claim 4 wherein said fluid receptacle is provided with multiple elements immersed therein to simulate fetal movements.

6. The garment claimed in claim 1 additionally including a rib belt for placement about the upper torso to exert a compressive force on a wearer's rib cage and reduce lung capacity.

7. The garment claimed in claim 1 additionally including a bladder pillow, cooperating means on said pillow and said main body for removably mounting and selective positioning of said bladder pillow on said main body to best suit the wearer for simulation purposes, said bladder pillow including a weight.

* * * * *